United States Patent
Biondi et al.

(10) Patent No.: US 9,380,474 B2
(45) Date of Patent: Jun. 28, 2016

(54) NETWORK MONITORING FOR ACTIVE MEDICAL DEVICE ALARMS

(71) Applicant: Cardiopulmonary Corporation, Milford, CT (US)

(72) Inventors: James W. Biondi, North Haven, CT (US); Joseph P. McGuire, Orange, CT (US); Carter Thomas Comunale, Southbury, CT (US)

(73) Assignee: Cardiopulmonary Corp., Milford, CT (US)

( * ) Notice: Subject to any disclaimer, the term of this patent is extended or adjusted under 35 U.S.C. 154(b) by 116 days.

(21) Appl. No.: 14/198,675

(22) Filed: Mar. 6, 2014

(65) Prior Publication Data
US 2014/0321262 A1   Oct. 30, 2014

Related U.S. Application Data

(60) Provisional application No. 61/775,064, filed on Mar. 8, 2013.

(51) Int. Cl.
*H04W 24/04* (2009.01)
*H04W 76/02* (2009.01)
*H04L 12/24* (2006.01)

(52) U.S. Cl.
CPC .............. *H04W 24/04* (2013.01); *H04L 41/06* (2013.01); *H04L 41/0681* (2013.01); *H04W 76/028* (2013.01)

(58) Field of Classification Search
None
See application file for complete search history.

(56) References Cited

U.S. PATENT DOCUMENTS

| | | | |
|---|---|---|---|
| 4,163,218 | A | 7/1979 | Wu |
| 4,206,456 | A | 6/1980 | Malinowski et al. |
| 4,333,002 | A | 6/1982 | Kozak |

(Continued)

FOREIGN PATENT DOCUMENTS

| | | |
|---|---|---|
| JP | 2003263507 | 9/2003 |
| JP | 2007086872 | 5/2007 |

(Continued)

OTHER PUBLICATIONS

Brunner et al., "Prototype Ventilator and Alarm Algorithm for the NASA Space Station," Journal of Clinical Monitoring, 5(2):90-99 (1989).

(Continued)

*Primary Examiner* — Diane Lo
(74) *Attorney, Agent, or Firm* — K&L Gates LLP

(57) ABSTRACT

A system and method for monitoring a patient over a network. In one embodiment, the system includes a network; a connection device configured to connect to the network, the connection device including a reporter that transmits reports to the network; a user interface device in communication with the network, the user interface device including a display and a gateway; a network management system in communication with the network, the network management system comprising an active alert system list listing each user interface device having a gateway that has registered with the network management system; a communications interface in communication with the network, the communications interface receiving reports from the reporter and transmitting reports to the network management system; wherein the network management system determines if a report received from the communications interface is to be sent to the user interface device as an alert.

24 Claims, 4 Drawing Sheets

(56) References Cited

U.S. PATENT DOCUMENTS

| | | |
|---|---|---|
| 4,371,932 A | 2/1983 | Dinwiddie, Jr. et al. |
| 4,417,573 A | 11/1983 | De Vries |
| 4,530,696 A | 7/1985 | Bisera et al. |
| 4,869,266 A | 9/1989 | Taylor et al. |
| 4,915,450 A | 4/1990 | Cooper |
| 4,958,645 A | 9/1990 | Cadell et al. |
| 4,972,314 A | 11/1990 | Getzinger et al. |
| 5,002,060 A | 3/1991 | Nedivi |
| 5,003,984 A | 4/1991 | Muraki et al. |
| 5,023,823 A | 6/1991 | Cargin, Jr. et al. |
| 5,049,873 A | 9/1991 | Robins et al. |
| 5,056,864 A | 10/1991 | Cooper |
| 5,238,001 A | 8/1993 | Gallant et al. |
| 5,319,355 A | 6/1994 | Russek |
| 5,319,363 A | 6/1994 | Welch et al. |
| 5,379,250 A | 1/1995 | Harshfield |
| 5,386,532 A | 1/1995 | Sodos |
| 5,441,047 A | 8/1995 | David et al. |
| 5,452,356 A | 9/1995 | Albert |
| 5,481,255 A | 1/1996 | Albert et al. |
| 5,482,050 A | 1/1996 | Smokoff et al. |
| 5,491,796 A | 2/1996 | Wanderer et al. |
| 5,511,553 A | 4/1996 | Segalowitz |
| 5,673,692 A | 10/1997 | Schulze et al. |
| 5,685,314 A | 11/1997 | Geheb et al. |
| 5,687,717 A | 11/1997 | Halpern et al. |
| 5,923,557 A | 7/1999 | Eidson |
| 5,944,659 A | 8/1999 | Flach et al. |
| 5,960,403 A | 9/1999 | Brown |
| 5,974,463 A | 10/1999 | Warrier et al. |
| 5,987,519 A | 11/1999 | Peifer et al. |
| 6,074,345 A | 6/2000 | van Oostrom et al. |
| 6,104,333 A | 8/2000 | Wood, Jr. |
| 6,112,194 A | 8/2000 | Bigus |
| 6,122,639 A | 9/2000 | Babu et al. |
| 6,128,371 A | 10/2000 | Hazama |
| 6,151,308 A | 11/2000 | Ibanez-Meier et al. |
| 6,158,430 A | 12/2000 | Pfeiffer et al. |
| 6,213,954 B1 | 4/2001 | Chen |
| 6,304,788 B1 | 10/2001 | Eady et al. |
| 6,339,771 B1 | 1/2002 | Zimowski et al. |
| 6,347,094 B1 | 2/2002 | Gopalakrishnan |
| 6,402,691 B1 | 6/2002 | Peddicord et al. |
| 6,408,330 B1 | 6/2002 | DeLaHuerga |
| 6,556,321 B1 | 4/2003 | Milton et al. |
| 6,589,170 B1 | 7/2003 | Flach et al. |
| 6,602,191 B2 | 8/2003 | Quy |
| 6,612,984 B1 | 9/2003 | Kerr, II |
| 6,618,709 B1 | 9/2003 | Sneeringer |
| 6,640,246 B1 | 10/2003 | Gary, Jr. et al. |
| 6,690,274 B1 | 2/2004 | Bristol |
| 6,693,545 B2 | 2/2004 | Brown et al. |
| 6,757,898 B1 | 6/2004 | Ilsen et al. |
| 6,832,199 B1 | 12/2004 | Kucek et al. |
| 6,839,753 B2 | 1/2005 | Biondi et al. |
| 6,942,616 B2 | 9/2005 | Kerr, II |
| 6,968,375 B1 | 11/2005 | Brown |
| 6,988,088 B1 | 1/2006 | Miikkulainen et al. |
| 6,989,757 B2 | 1/2006 | Geoffrey J. et al. |
| 7,088,233 B2 | 8/2006 | Menard |
| 7,221,137 B2 | 5/2007 | Bae et al. |
| 7,415,297 B2 | 8/2008 | Al-Ali et al. |
| 7,936,259 B1 | 5/2011 | Weibel et al. |
| 8,126,505 B2 | 2/2012 | Tulloch |
| 8,515,513 B2 | 8/2013 | Batchelder et al. |
| 2001/0051787 A1 | 12/2001 | Haller et al. |
| 2002/0016839 A1 | 2/2002 | Smith et al. |
| 2003/0023146 A1 | 1/2003 | Shusterman |
| 2003/0177036 A1 | 9/2003 | Oka et al. |
| 2005/0114711 A1 | 5/2005 | Hesselink et al. |
| 2005/0146431 A1 | 7/2005 | Hastings et al. |
| 2005/0188083 A1 | 8/2005 | Biondi et al. |
| 2005/0206518 A1 | 9/2005 | Welch et al. |
| 2007/0213600 A1* | 9/2007 | John ............... A61B 5/0031 600/300 |
| 2008/0004904 A1 | 1/2008 | Tran |
| 2008/0065768 A1 | 3/2008 | Ortiz et al. |
| 2008/0300471 A1 | 12/2008 | Al-Ali et al. |
| 2009/0045937 A1 | 2/2009 | Zimmerman |
| 2009/0125178 A1 | 5/2009 | Wilson |
| 2009/0146822 A1* | 6/2009 | Soliman ............ A61B 5/0002 340/573.1 |
| 2010/0078030 A1 | 4/2010 | Colburn |
| 2012/0095304 A1 | 4/2012 | Biondi |
| 2013/0151739 A1* | 6/2013 | Smith ............. G06F 19/3412 710/33 |

FOREIGN PATENT DOCUMENTS

| | | |
|---|---|---|
| WO | 98/29790 A2 | 7/1998 |
| WO | WO9829790 | 7/1998 |
| WO | 0040145 | 7/2000 |
| WO | 0060522 | 10/2000 |
| WO | 0113190 | 2/2001 |
| WO | 01/89362 | 11/2001 |
| WO | 02/069181 | 9/2002 |
| WO | 2003043494 | 5/2003 |

OTHER PUBLICATIONS

Japanese Official Action for Japanese Patent Application No. 2012-534279, 3 pages, Jul. 16, 2014.
PAX, United States Statutory Invention Registration No. H727, "Patient Monitoring Device," published Jan. 2, 1990.
PCT International Search Report and Written Opinion of International Searching Authority for International Patent Application No. PCT/US2010/052271, mailed Mar. 24, 2011, 12 pages.
International Searching Authority, "International Search Report," PCT Application No. PCT/US02/04515, mailed on May 8, 2003, 4 pgs.
Shabot, "Standardized acquisition of bedside data: The IEEE P1073 medical information bus," International Journal of Clinical Monitoring and Computing, 6:197-204 (1989).
Silvern et al., "Ventilator Risk Management Using a Programmed Monitor," Journal of Clinical Engineering, 14(3):217-224 (May/Jun. 1989).

* cited by examiner

NETWORK MONITORING FOR ACTIVE MEDICAL DEVICE ALARMS

RELATED APPLICATIONS

This application claims priority from U.S. Provisional Patent Application No. 61/775,064 filed on Mar. 8, 2013, the contents of which is incorporated herein by reference in its entirety.

FIELD OF THE INVENTION

The invention relates generally to the field of medical device monitoring and more specifically to monitoring the connectivity of medical device on a network.

BACKGROUND

Medical patient monitoring devices located at the patient bedside typically include an alarm that will activate if the monitored patient parameters exceed preset limits. This alarm is typically audible or passed to a remote annunciation device so that nurses located at a somewhat distant nursing station or a remote clinical operation center can respond to the alarm quickly. In addition, many devices are connected to a network that also raises an alarm on a monitoring device located at the nursing station or other remote or central location. This network-based alarm is generally considered a secondary alarm to the medical device's primary alarm. Because the alarm received over the network is a secondary alarm, meaning that the medical professionals rely on the primary alarm for notification of a patient adverse condition, the fact that the network may not deliver an alarm in a timely manner or at all, is not of serious concern.

With the desire to make patient monitors smaller and portable, devices are moving toward wearable monitors powered by a small battery. This portable monitor typically communicates with a base station over a wireless connection in order to transfer patient data to the network for transfer to a clinical monitoring or medical records management system only periodically, so as to save battery power. An exception to this periodic connection is if the device detects an out of range parameter value. In this case, the device typically connects to the network and sends an out of range data alarm immediately.

As a result, it becomes imperative when using these devices for the network to guarantee the delivery of an alarm condition. The present invention addresses this need.

SUMMARY OF THE INVENTION

The invention relates to a system for monitoring a patient over a network. In one embodiment, the system includes a network; a connection device configured to connect to the network, the connection device including a reporter that transmits reports to the network; a user interface device in communication with the network; a network management system in communication with the network; a communications interface in communication with the network, the communications interface receiving reports from the reporter and transmitting reports to the network management system. In another embodiment, the network management system includes an active alert system list listing each user interface device having a gateway that has registered with the network management system. In yet another embodiment, the user interface device includes a display and a gateway. In still yet another embodiment, the network management system determines if a report, received from the communications interface, is to be sent to the user interface device as an alert.

In one embodiment, the report is a determination of network degradation. In another embodiment, the communications interface receives reports from the connection device in a first protocol and communicates with the network management system in a second protocol. In yet another embodiment, the second protocol is TCP/IP using sockets. In still yet another embodiment, the connection device is assigned its own socket. In one embodiment, the system includes an application server in communication with the network. In another embodiment, the system includes a database server in communication with the network. In still yet another embodiment, the reporter periodically transmits a connected message to the communications interface.

In one embodiment, the network management system transmits an alert to the user interface device if the network management system does not receive a connected message within a predetermined amount of time. In another embodiment, the connection device includes a connection to a wireless network and the reporter periodically causes the connection device to disconnect from and reconnect to the wireless network. In still yet another embodiment, the reporter transmits a report containing the time it takes for the connection device to reconnect to the wireless network. In one embodiment, the network management system transmits an alert to the user interface device if the time it takes for the connection device to reconnect exceeds a predetermined threshold. In another embodiment, the reporter transmits a report with the signal strength of the wireless connection. In yet another embodiment, the network management system transmits an alert to the user interface device if the signal strength of the wireless connection is less than a predetermined threshold.

In another aspect, the invention relates to method for monitoring a patient over a network. In one embodiment, the method includes the steps of: providing a network; transmitting reports to the network by a connection device configured to connect to the network; providing a user interface device in communication with the network, the user interface device comprising: a display and a gateway; providing a network management system in communication with the network, the network management system comprising an alert list listing each user interface device having a gateway that has registered with the network management system; receiving, by a communications interface, reports from connection device; transmitting, by the communications interface, reports received from the connection device to the network management system; and determining by the network management system if a report received from the communications interface is to be sent to the user interface device as an alert.

In one embodiment, the report is a determination of network degradation. In another embodiment, the communications interface receives reports from the connection device in a first protocol and communicates with the network management system in a second protocol. In still another embodiment, the method includes the step of periodically transmitting a connected message to the communications interface by the connection device. In still yet another embodiment, the method includes the step of transmitting, by the network management system, an alert to the user interface device if the network management system does not receive a connected message from the connection device within a predetermined amount of time.

In one embodiment, the connection device includes a connection to a wireless network and the method further includes the steps of periodically disconnecting from and reconnecting to the wireless network by the connection device. In another embodiment, the method includes the step of transmitting, by the connection device, a report containing the time it takes for the connection device to reconnect to the wireless network. In yet another embodiment, the method includes the step of transmitting, by the network management system, an alert to the user interface device if the time it takes for the connection device to reconnect exceeds a predetermined threshold. In still yet another embodiment, the method includes the step of transmitting, by the connection device, a report with the signal strength of the wireless connection. In another embodiment, the method includes the step of transmitting, by the network management system, an alert to the user interface device if the wireless connection signal strength is less than a predetermined threshold.

BRIEF DESCRIPTION OF THE DRAWINGS

The structure and function of the invention can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

DESCRIPTION OF AN EMBODIMENT OF THE INVENTION

Figure 1:
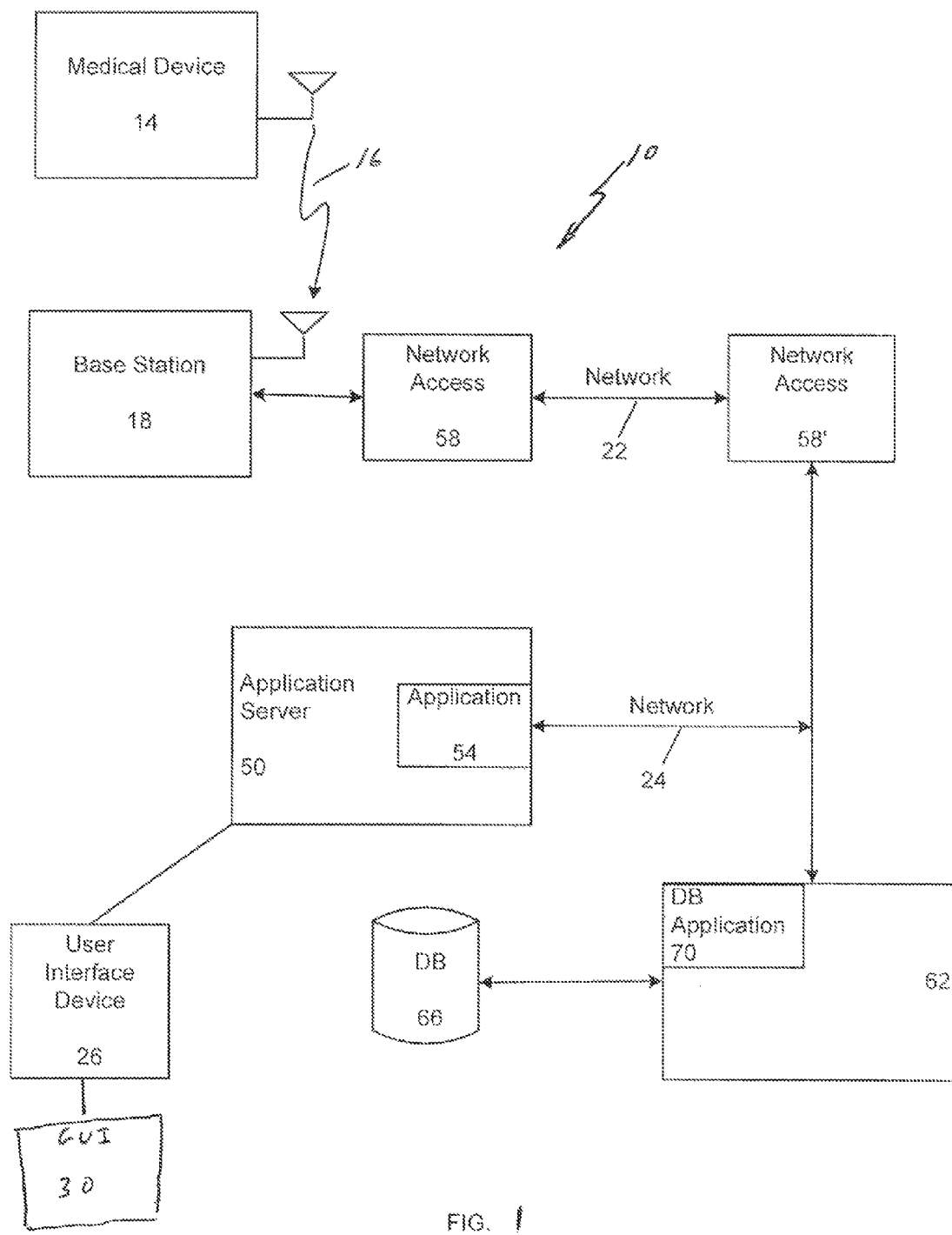
FIG. 1 is a block diagram of a general system constructed in accordance with the invention.

Referring to FIG. 1, and in brief overview, a networked medical monitoring system 10 that would make use of this invention is depicted. Such a system may include a medical device 14, that may be portable, and that is capable of communicating wirelessly over a wireless network 16 with a base station 18 connected to the hospital network 22. A User Interface Device 26 such as a workstation or portable device, such as tablet or smartphone, is also connected to the hospital network 22 and is configured to receive messages from the base station 18 and display the messages, which include data and alarms, on a display 30. Other non-wireless devices may connect to the network 22 through a bridge 20.

In operation, the medical device 14 monitors the patient's physiological data, clinical data and vital signs and periodically transmits wirelessly to the base station 18. The base station 18 upon receipt of the data and/or alarm information from the medical device 14 transmits the data and/or alarm to the User Interface Device 26 which causes the data and/or alarm to be displayed on a display unit 30.

In more detail, the medical device 14, which is in wireless communication with the base station 18, is in communication with the network 22 through the network access point 58. The network access point 58 converts the medical device's serial data protocol to TCP/IP for communication over the hospital network 22. Also connected to the network 22 is a network access point 58' which communicates with a network 24 to which the servers 50 and 62 are connected.

The server 50 is an application server 54 that communicates with the medical device 14 and serves the received data to a User Interface Device 26. The database server 62 is the server that writes data to and reads data from the database 66 upon request from the medical device 14, application server 62, or User Interface Device 26. Generally, any device, such as a network access point 58, 58', or server 50, 62, connected to a network is referred to as a connection device.

Figure 2:
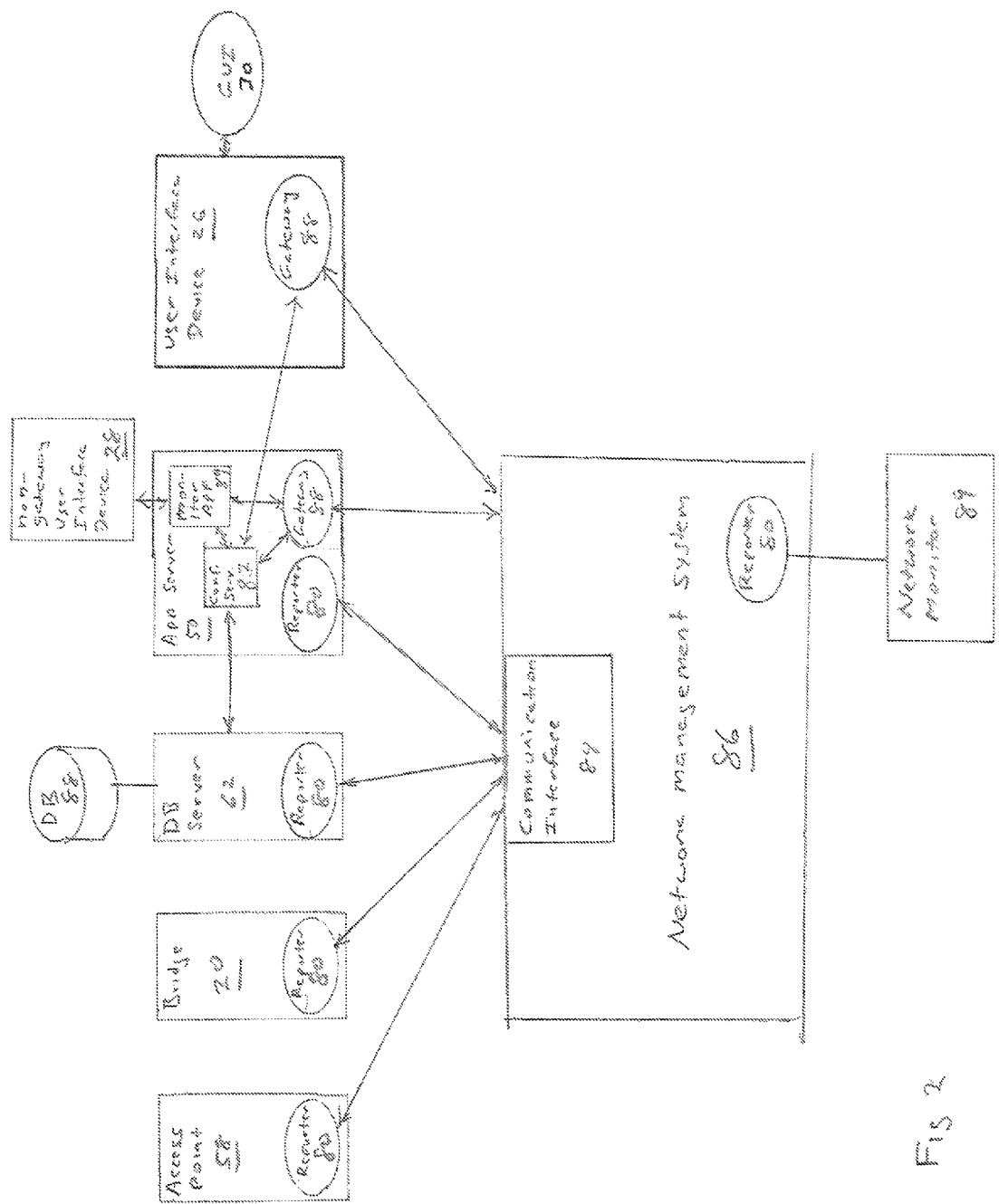
FIG. 2 is a diagram of connection chart of an embodiment of the communication connection between network devices that occurs in response to the operation of the invention.

Referring to FIG. 2, to monitor the health of the network, the system utilizes Reporters (generally 80) in each connection device. A Reporter 80 is an application that reports on system and network statistics and is responsible for reporting information about the operation of the system to a Network Management System 86. A Reporter 80 typically has local knowledge about the parameters of the network and system the Reporter 80 is monitoring.

Reporters 80 transmit reporting information to a Communications Interface 84 which is the interface used by Reporters 80 to communicate reports and alerts to a Network Management System 86. The Network Management System is responsible for receiving reports and sending alert notifications. There are communications links between the Reporters 80 and the Communications Interface 84. In one embodiment, the Reporters 80 communicate with the Communications Interface 84 using the HTTP protocol. In another embodiment, the Reporters 80 communicate with the Communications Interface 84 using TCP/IP sockets.

The Communications Interface 84, in one embodiment, is a part of the Network Management System 86. In other embodiments, the Communications Interface 84 is a standalone device in communication with the Reporters 80 as described above and in communication with the Network Management System 86 through a second communications link; for example TCP/IP sockets. In this example, one socket is typically assigned to each Reporter 80 registered with the Communications Interface 84.

The Communications Interface 84 has a program interface (API) to which all Reporters 80 must adhere. This interface may be a published interface to allow other developers to interface with the system. Reporters 80 first register with the Communications Interface 84 and are placed on the active reporter list. Once registered, a Reporter 80 provides "keep alive" or "connected" messages to remain registered. If the Communications Interface 84 does not receive a keep-alive message from a Reporter 80 in a predetermined amount of time, the Communications Interface removes that Reporter 80 from the active reporter list.

Registered Reporters 80 are able to submit reports to the Network Management System 86 through the Communications Interface 84. The Communications Interface 84 and the Network Management System 86 may reside on the same server, such as server 50. In addition, the Network Management System 86 may have its own Reporter 80, receive data from other network monitor programs 89 and transmit its reports to the User Interface Device 26

The Network Management System 86 communicates with a Gateway 88 in the User Interface Device 26. An example of a User Interface Device that has a Gateway 88 is a Workstation, but any device that includes a Gateway 88 can receive messages directly from the Network Management System 86. The Network Management System 86 provides configuration and messages to the User Interface Device 26. In one embodiment, the Gateway 88 is a System Message Service (SMS).

Any network device, such as a User Interface Device 26, on the network 22 that is interested in receiving network status messages first connects through the Gateway 88 to the Network Management System 86 to be entered onto a list of active alert systems entitled to receive network status updates. These inbound connections to the Network Management System 86 are TCP/IP socket connections that are managed by the Network Management System 86 as connections to Gateway 88. The Network Management System 86 listens for multiple inbound connections to provide network status-related system messages using a MessageManager object. In one embodiment, each of these connections uses TCP/IP socket connections to send and receive serialized XML objects. Each separate connection is managed by a single instance of the MessageManager object that has the ability to add, remove and send messages to entities on the list of active alert systems to receive network status updates.

When a report is received from a Reporter 80, the Network Management System 86 first determines if the report is of a nature such that an alert must be generated. If the report requires that an alert be generated, Network Management System 86 sends the alert to all listed active systems that have registered to receive network status updates. The Network Management System 86 makes sure that each transmission of the alert is successful and acknowledged. If any of the transmissions fail, the message connection is logged as a failure and the entity removed from the active alert systems list.

It is also possible for a Gateway 88 to be located on the Application Server 50. In this case, the Application Server 50 has registered with the Network Management System 86 to receive network status updates. When a non-Gateway User Interface Device 28 such as a smartphone wishes to receive the network status updates, that smartphone must register with a monitor application 89 on the Application Server 50 that is then responsible for relaying network status updates from Gateway 88 to the smartphone or other non-gateway device.

In one embodiment, alert messages from the Network Management System 86 have the general structure:
  NetMessageID—The ID of the alert. This ID maps to an alert in an alarms database table.
  NetMessage—The text of the alert.
  Priority—A numerical value indicating the importance of the message. 0 Most important-32, least important.
  EventTime—The date time of the event.
  For User Interface Devices 26 with a Gateway 88, the Gateway 88, upon receipt of an alert from the Network Management System 86, communicates with the configuration service 87 to receive details (such as the text) of the alert in response to the alert NetMessageID. In this way, alerts may be tailored to specific languages by changing the database file that the configuration service 87 accesses. The Gateway 88 then transmits the alert to the GUI 30 for display.

For User Interface Devices 28 without a Gateway 88, the Gateway 88 of the application server 50 again accesses the configuration service 87 as before, but upon receipt of the response from the configuration service 87, the Gateway 88 transmits the message to the Monitor Application 89, which then notifies the User Interface Device 28 (that does not have its own Gateway) of the alert. The Monitor Application 89 also communicates with the configuration service 87 to determine what the User Interface Device 28 without a Gateway is, and how to communicate with it (e.g. email, text, etc.).

Figure 3:
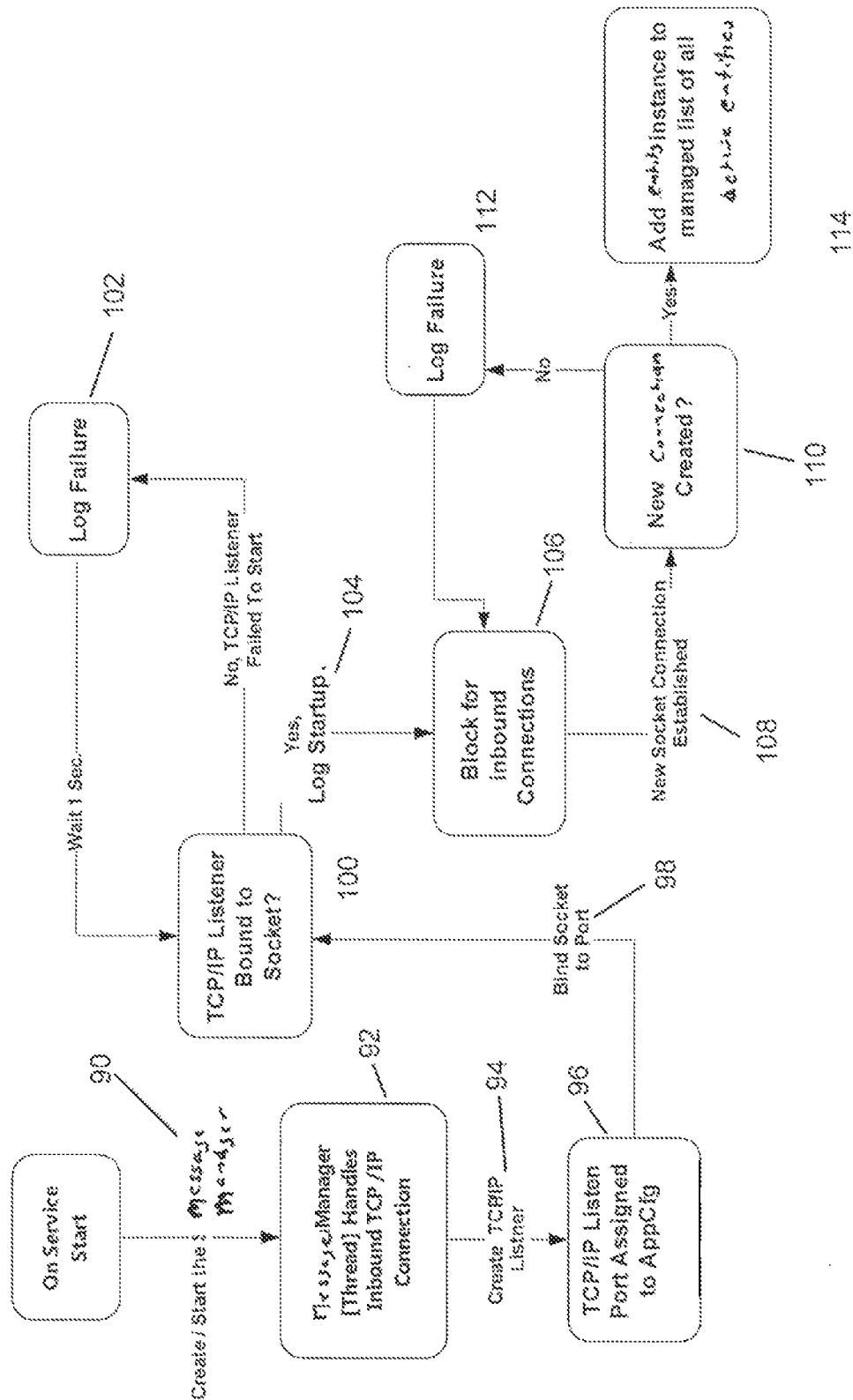
FIG. 3 is a diagram of an embodiment of the steps required to add an active alert system to a list of active alert systems.

In more detail and referring to FIG. 3, the Network Management System 86 begins by invoking the MessageManager 90 to handle the TCP/IP connections to the active systems. The MessageManager 90 creates a listener 93 to listen for connection requests, assigns a ListenPort 96, and binds a TCP/IP Socket to the Port 98. The MessageManager 90 then determines if the binding took place successfully and if not, logs a failure 102 before looping to check the binding again. If, however, the binding was successful, the Startup is logged as successful 104 and the MessageManager 90 waits for an inbound connection. Once the socket connection is established 108, the MessageManager 90 determines if the new Gateway connection is successful 110. If the connection is not successful, the failure is logged 112 and the MessageManager 90 loops to wait for the next inbound connection. If the connection is successful, the new connection is added to the list of active alert systems 114.

Figure 4:
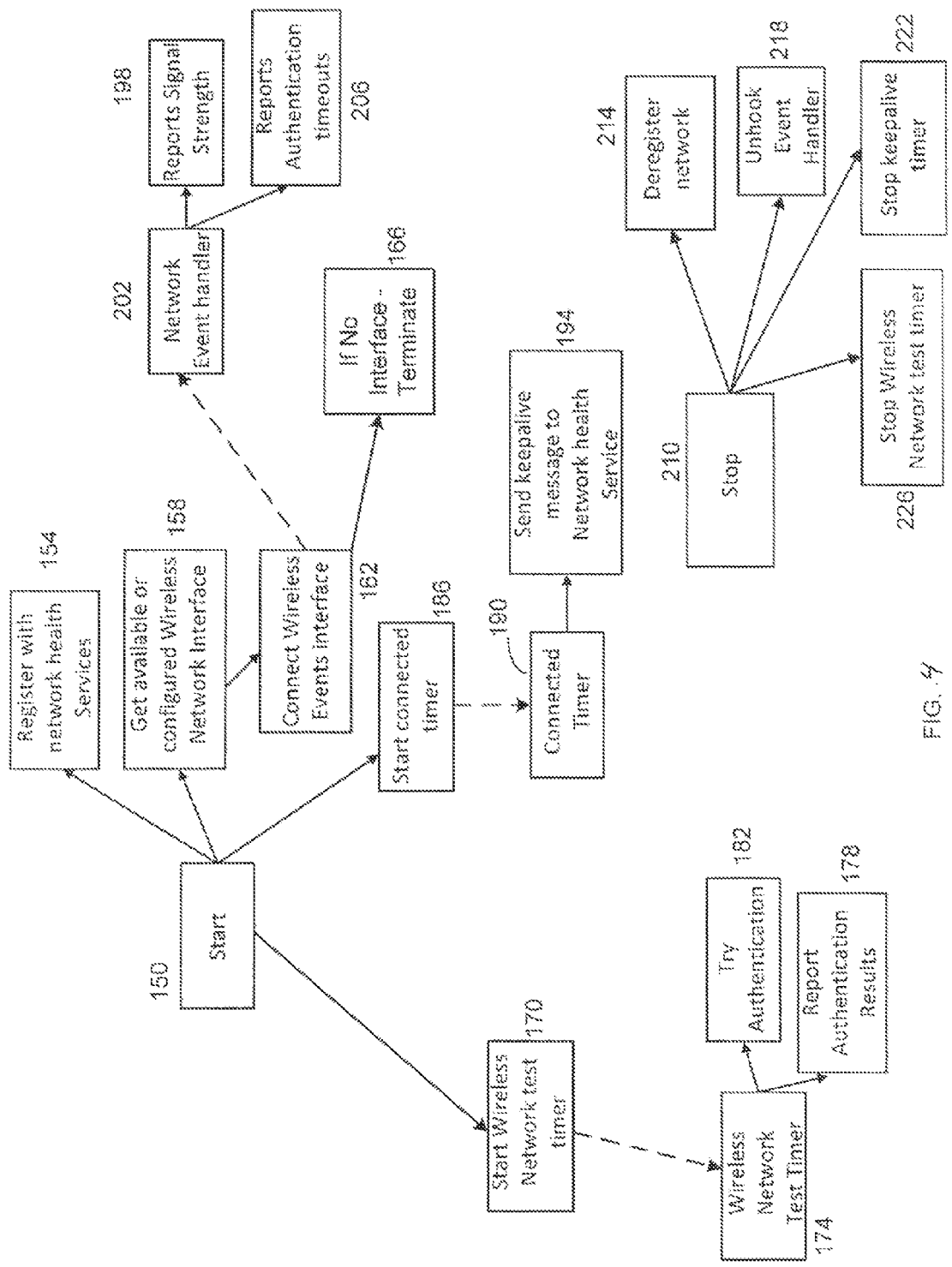
FIG. 4 is a flow diagram of an embodiment of a reporter program of the invention.

Referring to FIG. 4, in the case of a Reporter 80 monitoring a wireless network connected to the hospital network (FIG. 1), the Reporter 80 begins by starting 150 the wireless monitoring application. First, the application registers with the Communications Interface 84 to allow the application to report any wireless network anomalies that are detected. The application obtains a session ID from the Network Management System 86 to identify the instance of the connection to which the Reporter 80 will communicate reports to the Network Management System 86. The application next scans the available network interfaces and if a wireless interface is functional, selects the configured wireless interface 158 as the link being monitored and connects the wireless interface link to the event handler 162. If no wireless interface is available, the application quits and logs 166 the result to a database 88 through the database server 62 (FIG. 2).

The Reporter 80 then obtains parameters for monitoring the wireless monitor from a configuration file internal to the Reporter 80. The parameters in the configuration file include: the acceptable time for validation (in seconds); how often to try revalidating (in seconds); and how often to send "keep-alive" or "connected" messages (in seconds). The application then starts 170 a timer to execute network tests in accordance with the configured settings (in seconds) and executes the network test function 174 when the network test timer expires. The network test evaluates network results such as re-authentication 182 and sends the report 178 to the Network Management System 86. If the authentication fails, the failure is reported by the Network Management System 86 as an alarm.

The application also starts the "connected" timer 182 and transmits a connected message 194 whenever the "connected" timer expires 190. The "connected" function sends a "connected" message to the Network Management System 86 or logs the error in local memory if the connection failed.

Another parameter measured for a wireless device is the signal strength of the network to which the wireless device is attached. When a signal strength change event 202 occurs, an event message is received by the application from the wireless hardware, and the Reporter 80 reports 198 the change to the Network Management System 86. If the signal strength in the report indicates that the value is below an acceptable threshold, the Network Management System 86 sends an alarm to each of the systems in the active list.

When other connection events occur 202, the Reporter 80 notifies the Network Management System 86. If a connection event is significant, such as a response time exceeding a maximum, the message from the Network Management System 86 is sent as an alarm to the Gateway 88 on the active alert system list. If the Network Management System 86 cannot be contacted, an error is logged locally in memory and the Reporter 80 attempts to reregister with the Communications Interface 84.

Finally, when the wireless device is turned off, the application executes the stop functions 210. These include deregistering 212 the Reporter 80 from the Communications Interface 84; unlinking 218 the event handler; stopping 222 the "connected" timer; and stopping 226 the network test timer. At this point, the Reporter 80 can no longer communicate with the Network Management System 86. It should also be noted that although this Reporter 80 is described as a Reporter 80 monitoring a wireless device, it is also useful for monitoring other networked devices, including the servers themselves.

It should be understood that the order of steps or order for performing certain actions is immaterial so long as the present teachings remain operable. Moreover, two or more steps or actions may be conducted simultaneously.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

What is claimed is:

1. A system for monitoring a patient over a network comprising:
    a network;
    a connection device configured to connect to the network, the connection device comprising a reporter that transmits reports to the network;
    a user interface device in communication with the network, the user interface device comprising:
        a display; and
        a gateway;
    a network management system in communication with the network, the network management system comprising an active alert system list listing each user interface device having a gateway that has registered with the network management system;
    a communications interface in communication with the network, the communications interface receiving reports from the reporter and transmitting reports to the network management system;
    wherein the network management system determines if a report, received from the communications interface is to be sent to the user interface device as an alert.

2. The system of claim 1 wherein the report is a determination of network degradation.

3. The system of claim 1 wherein the communications Interface receives reports from the connection device in a first protocol and communicates with the network management system in a second protocol.

4. The system of claim 3 wherein the second protocol is TCP/IP using sockets.

5. The system of claim 4 wherein the connection device is assigned its own socket.

6. The system of claim 1 further comprising an application server in communication with the network.

7. The system of claim 1 further comprising a database server in communication with the network.

8. The system of claim 1 wherein the reporter periodically transmits a connected message to the communications interface.

9. The system of claim 8 wherein the network management system transmits an alert to the user interface device if the network management system does not receive a connected message within a predetermined amount of time.

10. The system of claim 8 wherein the connection device includes a connection to a wireless network and wherein the reporter periodically causes the connection device to disconnect from and reconnect to the wireless network.

11. The system of claim 10 wherein the reporter transmits a report containing the time it takes for the connection device to reconnect to the wireless network.

12. The system of claim 11 wherein the network management system transmits an alert to the user interface device if the time it takes for the connection device to reconnect exceeds a predetermined threshold.

13. The system of claim 10 wherein the reporter transmits a report with the signal strength of the wireless connection.

14. The system of claim 13 wherein the network management system transmits an alert to the user interface device if the signal strength of the wireless connection is less than a predetermined threshold.

15. A method for monitoring a patient over a network comprising the steps of:
    providing a network;
    transmitting reports to the network by a connection device configured to connect to the network;
    providing a user interface device in communication with the network, the user interface device comprising: a display; and a gateway;
    providing a network management system in communication with the network, the network management system comprising an alert list listing each user interface device having a gateway that has registered with the network management system;
    receiving, by a communications interface, reports from connection device;
    transmitting, by the communications interface, reports received from the connection device to the network management system; and
    determining by the network management system if a report received from the communications interface is to be sent to the user interface device as an alert.

16. The method of claim 15 wherein the report is a determination of network degradation.

17. The method of claim 15 wherein the communications interface receives reports from the connection device in a first protocol and communicates with the network management system in a second protocol.

18. The method of claim 15 further comprising the step of periodically transmitting a connected message to the communications interface by the connection device.

19. The method of claim 18 further comprising the step of transmitting, by the network management system, an alert to the user interface device if the network management system does not receive a connected message from the connection device within a predetermined amount of time.

20. The method of claim 15 wherein the connection device includes a connection to a wireless network and wherein the method further includes the steps of periodically disconnecting from and reconnecting to the wireless network by the connection device.

21. The method of claim 20 further comprising the step of transmitting, by the connection device, a report containing the time it takes for the connection device to reconnect to the wireless network.

22. The method of claim 21 further comprising the step of transmitting, by the network management system, an alert to the user interface device if the time it takes for the connection device to reconnect exceeds a predetermined threshold.

23. The method of claim 20 further comprising the step of transmitting, by the connection device, a report with the signal strength of the wireless connection.

24. The method of claim 23 further comprising the step of transmitting, by the network management system, an alert to the user interface device if the wireless connection signal strength is less than a predetermined threshold.

* * * * *